(12) United States Patent
Mohan

(10) Patent No.: US 7,319,671 B1
(45) Date of Patent: Jan. 15, 2008

(54) TIME DIVISION POLLING SCHEME FOR NETWORK MANAGEMENT SYSTEMS

(75) Inventor: Sam Mohan, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 678 days.

(21) Appl. No.: 09/822,907

(22) Filed: Mar. 29, 2001

(51) Int. Cl.
*G01R 31/08* (2006.01)

(52) U.S. Cl. ................. 370/248; 370/242; 370/250

(58) Field of Classification Search ......... 370/241–253
See application file for complete search history.

(56) References Cited

U.S. PATENT DOCUMENTS

| | | | |
|---|---|---|---|
| 5,710,885 A | | 1/1998 | Bondi ................. 395/200.54 |
| 6,014,707 A | * | 1/2000 | Miller et al. ................. 709/232 |

\* cited by examiner

*Primary Examiner*—Huy D. Vu
*Assistant Examiner*—Jason Mattis
(74) *Attorney, Agent, or Firm*—Cindy Kaplan

(57) ABSTRACT

Techniques for monitoring nodes in a network are provided. A circular list of bins is maintained and each bin stores identifiers to zero or more nodes to be monitored. At periodic intervals, the nodes specified by a bin are processed such as by sending a polling message to the node. Additionally, responses from polling messages can also be processed at periodic intervals.

20 Claims, 9 Drawing Sheets

| IP address | SNMP OID | Expected Response Time ($T_{ERT}$) | Poll Interval ($T_P$) | Transmission Count | Maximum Transmission Count Permitted | Time Stamp from Latest Response | Operational Status |
|---|---|---|---|---|---|---|---|
| $IP_A$ | $OID_{A1}$ | $E_{A1}$ | $P_{A1}$ | $C_{A1}$ | $M_{A1}$ | $T_y$ | $S_A$ |
| $IP_A$ | $OID_{A2}$ | $E_{A2}$ | $P_{A2}$ | $C_{A2}$ | $M_{A2}$ | $T_f$ | $S_F$ |
| ... | | | | | | | |
| $IP_B$ | $OID_{B1}$ | $E_{B1}$ | $P_{B1}$ | $C_{B1}$ | $M_{B1}$ | $T_u$ | $S_u$ |
| ... | | | | | | | |
| $IP_Z$ | $OID_{Zm}$ | $E_{Zm}$ | $P_{Zm}$ | $C_{Zm}$ | $M_{Zm}$ | $T_d$ | $S_A$ |

TIME DIVISION POLLING SCHEME FOR NETWORK MANAGEMENT SYSTEMS

BACKGROUND OF THE INVENTION

The present invention relates to polling schemes for network management systems. More specifically, the invention relates to time division polling schemes for network management systems.

With the advent of faster and cheaper network communication devices, the communication infrastructure has been expanding in size lately. These network devices, including specialized computer systems dedicated to processing communication traffic, have been increasing in numbers and systems to monitor the statuses of network devices and the health of the network as a whole, have become almost a basic requirement for any network management system.

Large communication networks typically include heterogeneous network devices and these devices can vary widely in size and power. The communication among these devices is usually by a common protocol, such as Internet Protocol, SONET, etc. The network devices that use Internet Protocol are interlinked through routers, bridges, multiplexors, and hubs, which provide the essential support to transport the communication payload from a source to a destination in the network.

In order to ensure smooth operation of the network, a network management system may be deployed in the network. The network management system, which is a software system running on a network device in the network, gathers information about the topology of the network, the operational statuses of network devices and the interconnection among them, performance statistics of the different segments of the network and potential trouble spots in the network, if any, and may also provide a mechanism to configure the network.

The network management system utilizes a network management framework consisting of a management protocol and a set of standardized managed objects with supporting schemata. As an example, the Simple Network Management Protocol (SNMP) is a network management framework that is quite common in the field.

Initially, the network management system discovers the different network devices (or objects) connected to the network and stores all the information it gathers, like Internet Protocol (IP) address and the like, in a local database. Then, the network management system periodically queries or polls these nodes for their operation statuses and provides the current status of the network in a graphical form to network personnel. As new network devices are added to the current network, these devices are combined with the existing ones in the database and their statuses are monitored as well.

If there is no response from a network device for a poll within a specific time limit, the poll is retransmitted. Response to this poll is awaited for a specific time limit and, in the absence of a response, the poll is retransmitted. This retransmission is typically done a specific number of times and if there is no response after the last poll, the network device is declared to have an inactive operational status and the database is updated accordingly. During the process of retransmissions, the device is usually said to be in an unresponsive state.

If a network device receives a large number of polls in a short time frame when it is busy dealing with network payload traffic, then the network device may send delayed responses or even discard these polls without processing. The delayed responses and discarding of polls will lead to retransmissions from the network management system and thus resulting in more traffic in the network and more processing load for the network device. The transient rise in polling requests at the input end of the network device may adversely affect the device's ability to process the payload in a timely way. This is particularly true when the devices are optimized for an application and hence may not have enough resources to effectively deal with the spurt in the workload. Accordingly, network management systems should avoid overloading the network and/or devices with polling requests.

One way to avoid overloading the network with polling requests is to restrict the number of polls that are dispatched in such a way that there cannot be more than a fixed number of network management system poll requests in the network at any one time. For example, the Hewlett-Packard Open View (HPOV) network management system accomplishes this by restricting the number of unresponsive network devices to three. That is, when there are three network devices in an unresponsive state in the database at any time, the network management system stops sending polls to other devices until at least one of them changes state to an active (response received) or fail (no response) state. This can ensure that the network does not get overloaded with a possible flood of poll requests and responses in a short time frame. However, this technique may be slow to discover new devices and potential problems in very large networks.

Another proposed way to avoid overloading the network with polling requests is to send the polls at a fixed rate using a rate controlling mechanism (see, e.g., U.S. Pat. No. 5,710,885, issued Jan. 20, 1998 to Bondi). Devices to be polled are stored in a queue and poll requests are sent at a rate determined by the rate controlling mechanism. Although this technique can allow for a variable number of unresponsive devices, implementation can be difficult and the results may not be satisfactory in many situations.

SUMMARY OF THE INVENTION

The present invention provides innovative techniques for polling devices or nodes in a network by network management systems. As an example, identifiers for nodes to be polled can be stored in a circular list of bins. At periodic time intervals, the nodes identified in one bin can be processed (e.g., sending a polling message). The next bin will be processed at the next time interval and so on around the circular list. In this manner, a more efficient network management system can be achieved and the utilization of available resources may be increased in a more optimal way by spreading out the polls evenly across the time line. Some specific embodiments of the invention are described below.

In one embodiment, the invention provides a method of monitoring nodes in a network including multiple nodes. At least one node identified by an identifier in a set of a circular list of sets is processed. Each set of the circular list of sets includes zero or more identifiers of nodes. The processing may include sending a polling message to the at least one node. After processing, the next set of the circular list of sets can be advanced to for subsequent processing.

In another embodiment, the invention provides a method of monitoring nodes in a network including multiple nodes. A signal from a timer is received at periodic intervals. Polling responses are processed and at least one node identified by an identifier in a set of a circular list of sets is processed by sending a polling message to the least one node. Each set of the circular list of sets includes zero or more identifiers of nodes. After processing, the next set of the circular list of sets can be advanced to for subsequent processing.

Other features and advantages of the invention will become readily apparent upon review of the following description in association with the accompanying drawings, where the same or similar structures are designated with the same reference numerals.

BRIEF DESCRIPTION OF THE DRAWINGS

FIG. 5 shows an example of a table that can be maintained to store information on various nodes in the network.

DETAILED DESCRIPTION OF PREFERRED EMBODIMENTS

In the description that follows, the present invention will be described in reference to embodiments that monitor nodes in a network. More specifically, the embodiments will be described in reference to embodiments that utilize Internet Protocol and SNMP. However, embodiments of the invention are not limited to any particular environment, application or implementation. Therefore, the description of the embodiments that follows is for purposes of illustration and not limitation.

Figure 1:
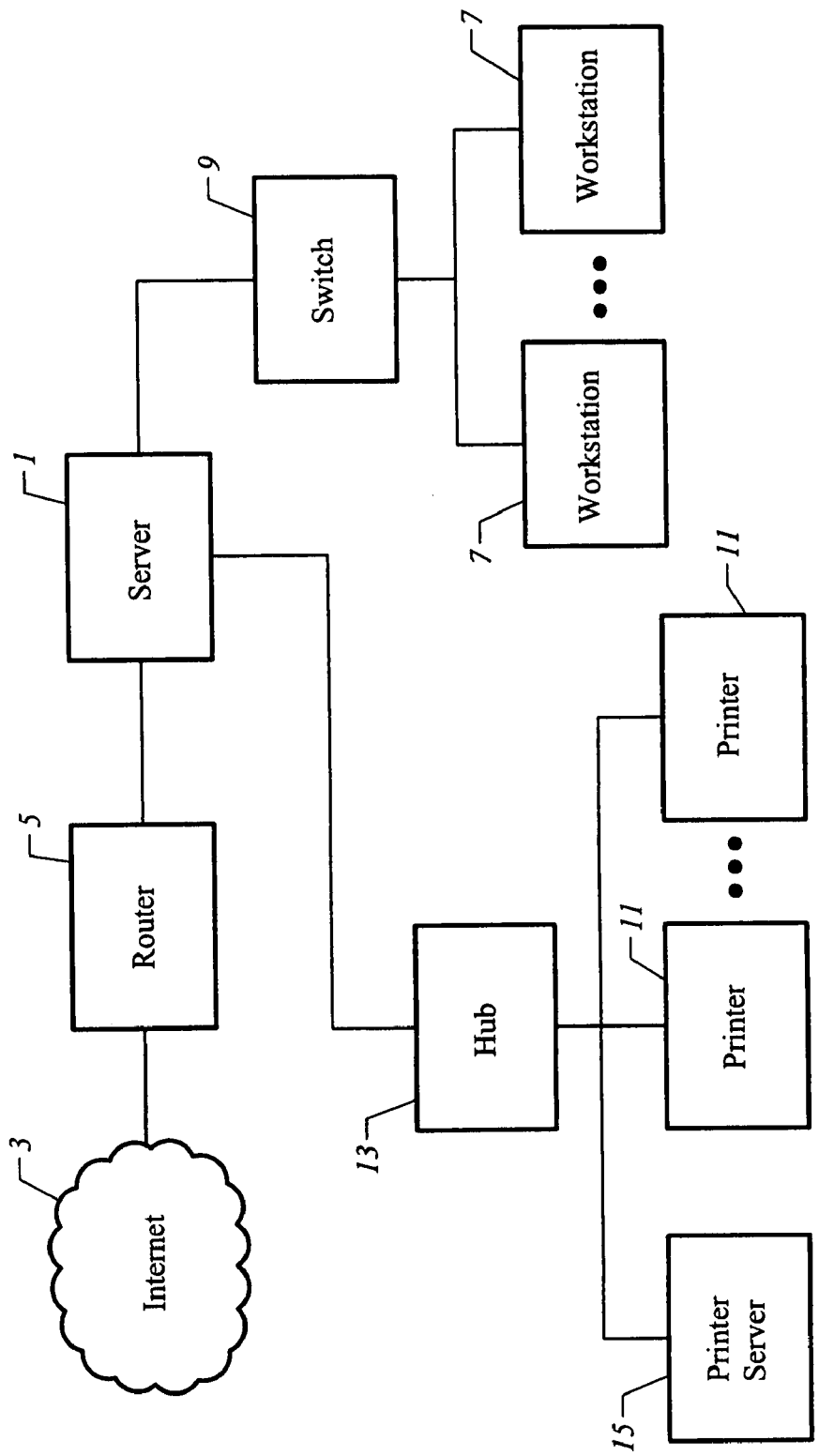
FIG. 1 shows an example of a network and multiple network devices or nodes.

FIG. 1 shows an example of network devices in a network. A server 1 provides resources such as files or applications to clients. As an example, server 1 can be a mainframe computer with a large amount of storage and processing power. Server 1 may communicate with a wide area network 3 (e.g., the Internet) through a router 5.

Server 1 can communicate with multiple workstations through a switch 9. Workstation 7 are examples of clients that may be utilized to access resources provided by server 1. Communication with printers 11 is made through a hub 13. As shown, a printer server 15 is connected to the hub and may be utilized to manage the printers and their jobs.

The network in FIG. 1 is provided to illustrate examples of nodes that can be monitored in a network. For example, the nodes include network devices that perform tasks such as server 1, workstations 7, printers 11 and printer server 15, and nodes that send network packages between other nodes such as router 5, switch 9 and hub 13. Any and all of these nodes (and others) can be monitored by a network management system. For simplicity, we will use the term node to describe that which is being monitored by the network management system. It should be understood that the nodes can also be objects within a single network device.

The nodes in FIG. 1 can be monitored by a network management system executing on server 1. Additionally, a network management system could be executing on printer server 15 to monitor nodes such as printers 11. Other network management systems can be utilized to monitor banks of modems or other network devices. Therefore, embodiments of the invention can be utilized to monitor a very diverse range of nodes in a network and is not limited to any particular network topology.

Figure 2:
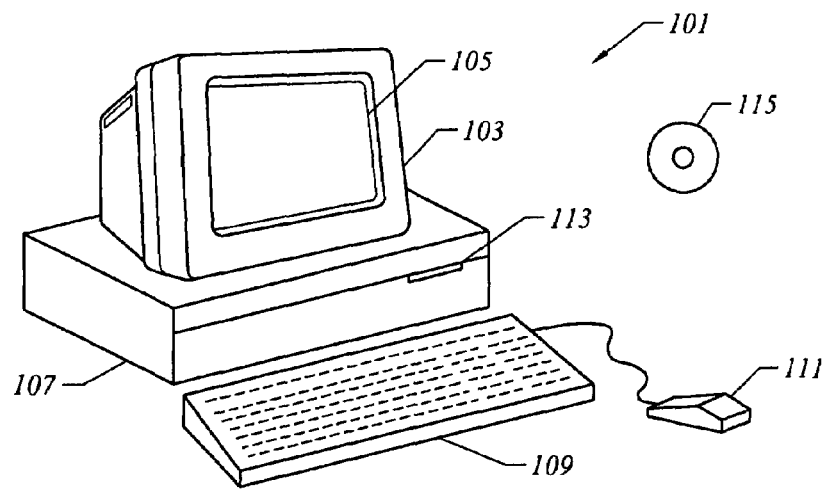
FIG. 2 illustrates an example of a computer system that can be utilized to execute the software of an embodiment of the invention.

FIG. 2 illustrates an example of a computer system that can be used to execute the software of an embodiment of the invention. FIG. 2 shows a computer system 101 that includes a display 103, screen 105, cabinet 107, keyboard 109, and mouse 111. Mouse 111 can have one or more buttons for interacting with a graphical user interface. Cabinet 107 houses a CD-ROM drive 113, system memory and a hard drive (see FIG. 3) which can be utilized to store and retrieve software programs incorporating computer code that implements the invention, data for use with the invention, and the like. Although CD-ROM 115 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 3:
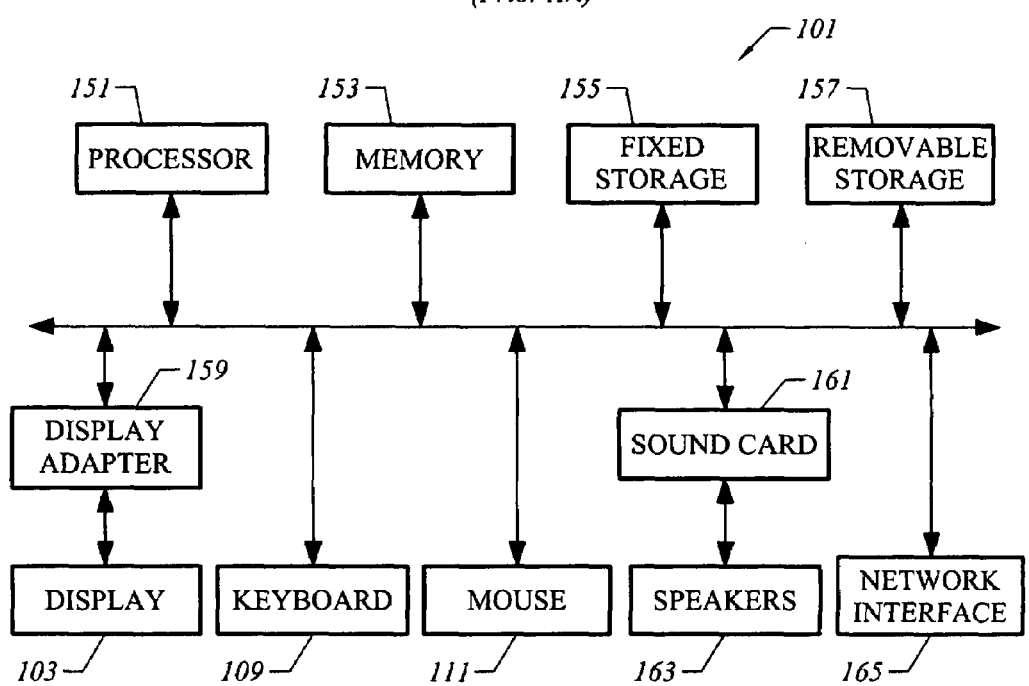
FIG. 3 illustrates a system block diagram of the computer system of FIG. 2.

FIG. 3 shows a system block diagram of computer system 101 used to execute the software of an embodiment of the invention. As in FIG. 2, computer system 101 includes monitor 103 and keyboard 109, and mouse 111. Computer system 101 further includes subsystems such as a central processor 151, system memory 153, fixed storage 155 (e.g., hard drive), removable storage 157 (e.g., CD-ROM drive), display adapter 159, sound card 161, speakers 163, and network interface 165. Other computer systems suitable for use with the invention can include additional or fewer subsystems. For example, another computer system could include more than one processor 151 (i.e., a multi-processor system) or a cache memory.

The system bus architecture of computer system 101 is represented by arrows 167. However, these arrows are illustrative of any interconnection scheme serving to link the subsystems. For example, a local bus could be utilized to connect the central processor to the system memory and display adapter. Computer system 101 shown in FIG. 3 is but an example of a computer system suitable for use with the invention. Other computer architectures having different configurations of subsystems can also be utilized.

Computer system 101 is illustrative of an architecture server 1 in FIG. 1 that can be utilized to execute the network management system. As discussed above, other network devices can be utilized to execute network management systems and these devices may include more or fewer subsystems. Therefore, it is not required that the network device that executes the network management system includes all the subsystems shown.

Figure 4:
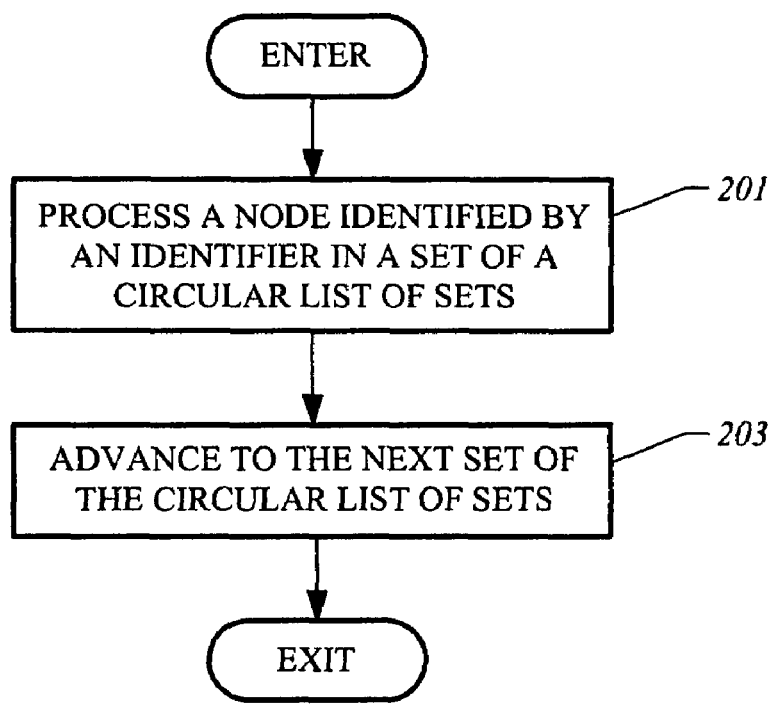
FIG. 4 shows a flowchart of a process of monitoring nodes in a network utilizing a circular list of sets.

Now that an example of a network has been described, it may be beneficial to describe the high level flow of one embodiment of the invention. FIG. 4 shows a flowchart of a process of monitoring nodes in a network utilizing a circular list of sets. At a step 201, a node identified by an identifier in a set of circular list of sets is processed. In general, the circular list is a circular list of bins that can store zero or more identifiers that identify nodes in the network. The structure of the bins can be any one of a number of known structures including lists, arrays, queues, stacks, hash tables, trees, and the like. Accordingly, the bins will also be described as sets of zero or more identifiers that can be stored in a variety of structures.

The processing of a node at step 201 typically includes sending a polling message to the node identified by the identifier. As will be described below, other processing of the node can be performed. After processing the node, the flow advances to the next set of the circular list of sets at a step 203. As with all the flowcharts described herein, steps can be added, deleted, combined, and reordered without departing from the spirit and scope of the invention. For example, although FIG. 4 shows that the flow advances to the next set of the circular list of sets after a node is processed, it should be understood that the flow can also be advanced to the next set of the circular list of sets before processing the node.

FIG. 5 shows an example of a table that can be utilized to monitor nodes in a network. Each row in the table can store information on the nodes to be polled on the network. The information in the table can be populated through the discovery process or manually by network personnel. The fields of the table will be described in the following paragraphs.

The Internet Protocol address is the address of the node on the network. The SNMP object identifier specifies the object of the node to be polled. As shown, a single Internet Protocol address may have more than one object that is to be polled. Typically, the table is optimized for access using the Internet Protocol address and the SNMP object identifier as indexes.

The table also stores the expected response time for each node, which is the amount of time it is expected it will take for the node to respond to a polling message. The poll interval is also stored and is the time interval between polling messages, assuming that the node sends a response to the polling message (i.e., no retransmissions).

The transmission count represents the number of polling messages that have been sent to the node and the maximum transmission count permitted represents the number of transmissions that will be sent to a node, which if are not responded to, will indicate that the node is not active or failed.

The time stamp from the latest response represents the time when the last response to a polling message was received. The operational status indicates the status of the node and can include active, unresponsive and failed. Typically, "active" indicates that the node has responded to the last polling message, "unresponsive" indicates that the node has not responded to the last polling message and "failed" indicates that the node has not responded to the maximum transmission count permitted of polling messages. Although these status notations are fairly common, other status notations can be utilized in other embodiments.

Figure 6:
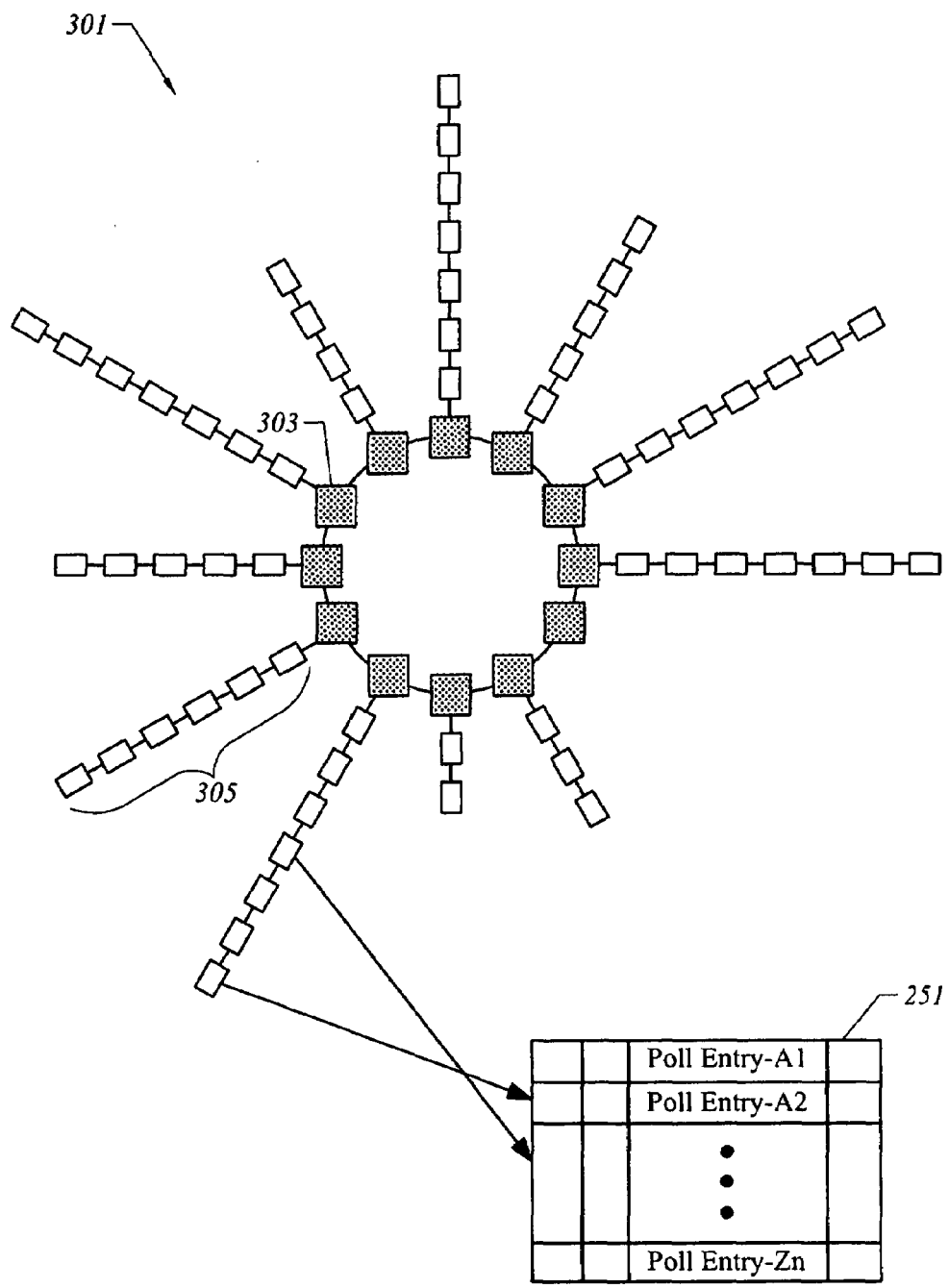
FIG. 6 shows a diagram of a circular list of bins or sets of identifiers identifying nodes in the network.

FIG. 6 shows an example of a circular list that can be utilized to poll nodes on the network. A circular list 301 can be thought of as a wheel and spokes data structure. Circular list 301 is a circular list of bins 303. Each bin (or set) 303 can store zero or more identifiers 305 that identify nodes in the network. As an example, FIG. 6 shows that identifier 305 can be pointers into table 251 shown in FIG. 5. The pointer may represent one field in table 251 or as described above, the pointer can be a combination of multiple fields such as the Internet Protocol address and SNMP object identifier.

In general, bins 303 can be thought of as time slot bins as the bins are processed at periodic time intervals. For example, a timer can be set to a specific time interval and each time the timer goes off, a bin is processed and the flow advances to the next bin for processing when the timer goes off again.

Figure 7:
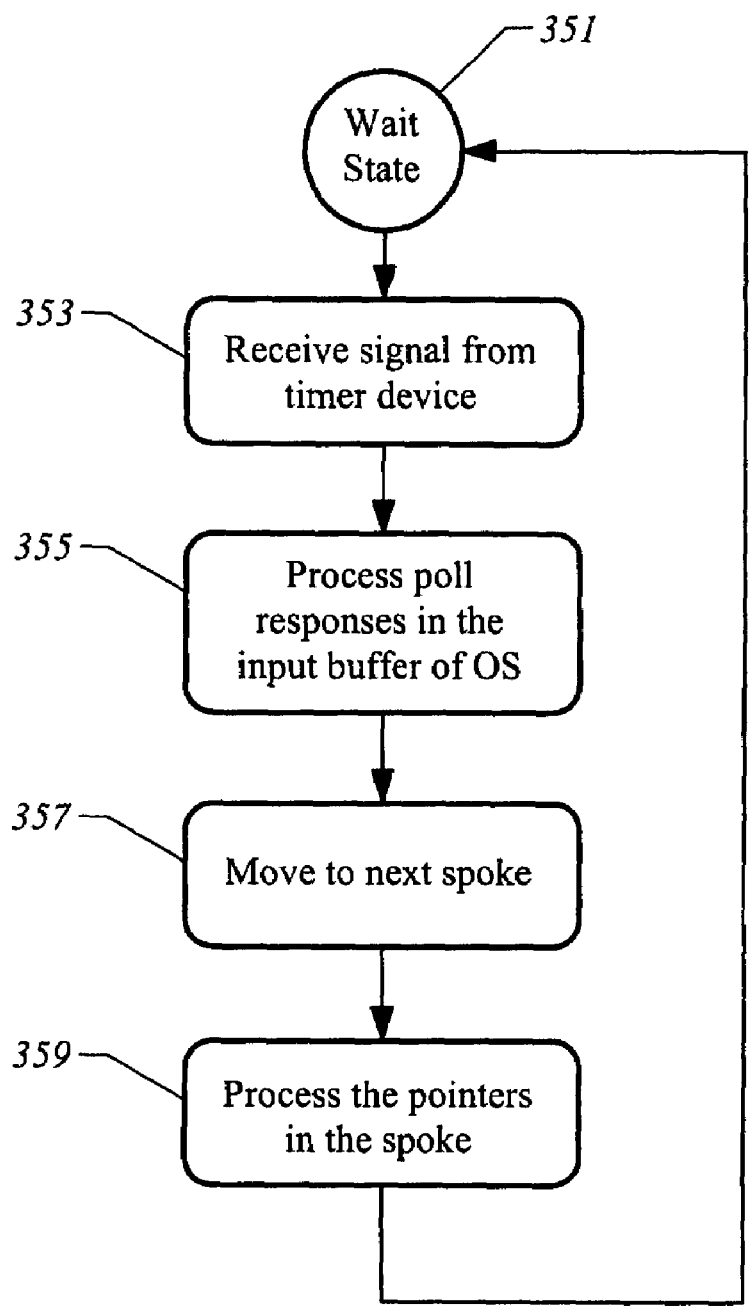
FIG. 7 shows a flowchart of a process of network management performed at periodic intervals.

FIG. 7 shows a flowchart of a process of processing a bin or spoke of the circular list. At a step 351, the polling process is in a wait state and will be awakened by a signal from a timer device. A signal is received from the timer device at a step 353 and poll responses in the input buffer of the operating system are processed at a step 355. As responses to polling messages are received, they can be stored in an input buffer until they are ready to be processed.

At a step 357, the flow of the polling process moves to the next spoke or bin. The pointers in the spoke or bin are processed at a step 359. Perhaps the most common processing includes sending a polling message to each of the nodes identified by the pointers.

Figure 8:
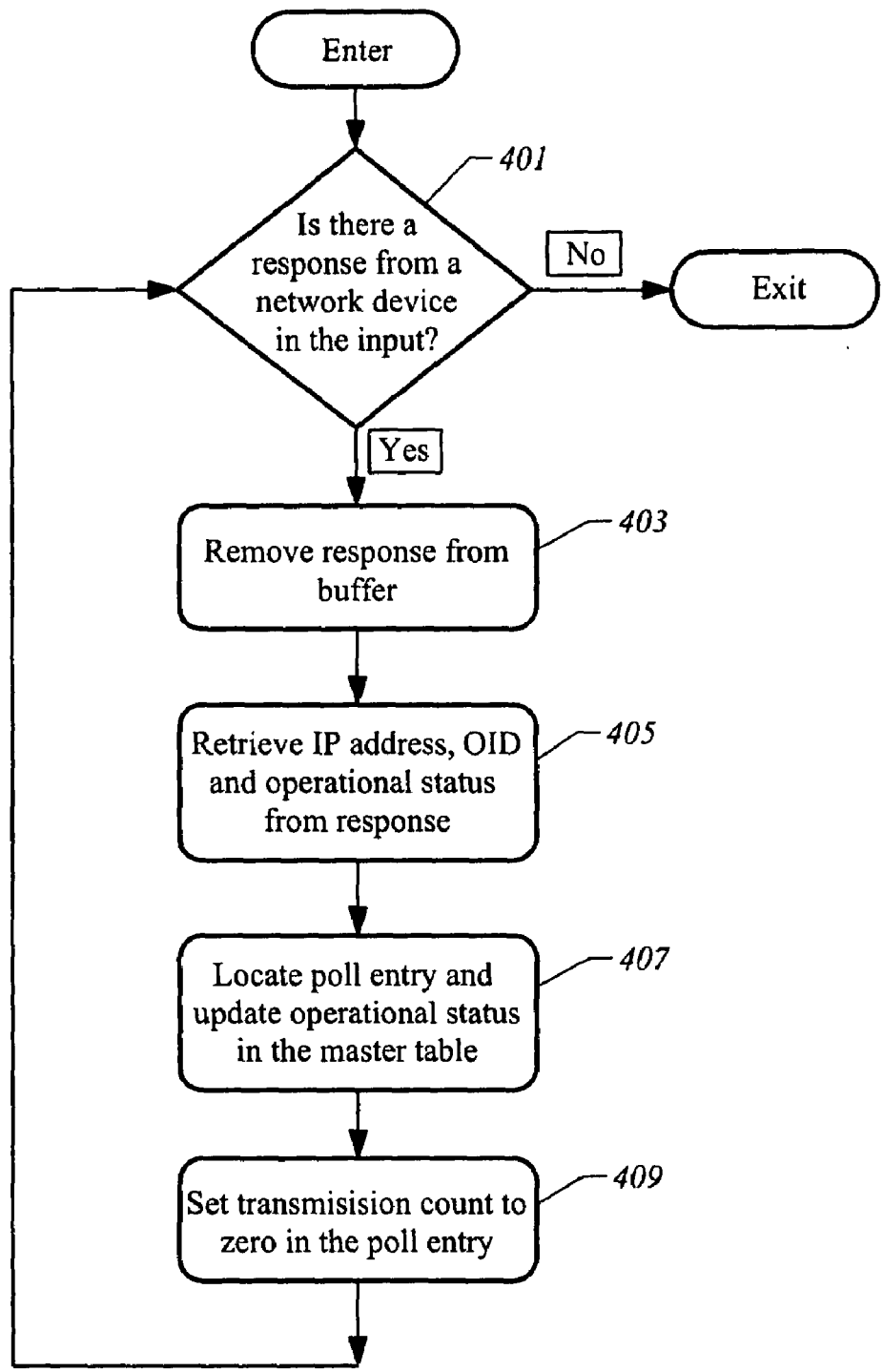
FIG. 8 shows a flowchart of a process of processing polling responses that have been received in a time interval.

FIG. 8 shows a flowchart of a process of processing the responses to the polling messages shown at step 355 in FIG. 7. At a step 401, it is determined whether there is response from a network device in the input buffer. If there is a response from a polling message in the buffer, the response is removed from the buffer at a step 403.

At a step 405, the Internet Protocol address, SNMP object identifier and operational status are retrieved from the response. Utilizing the Internet Protocol address and SNMP object identifier, the entry in table 251 for this node is located and the operational status is updated in the table at a step 407. The transmission count for the node in table 251 is then set to zero at a step 409. Since the node has responded, the transmission count is set to zero to indicate that there are zero polling messages that have been sent and to which responses have not been received.

Figure 9:
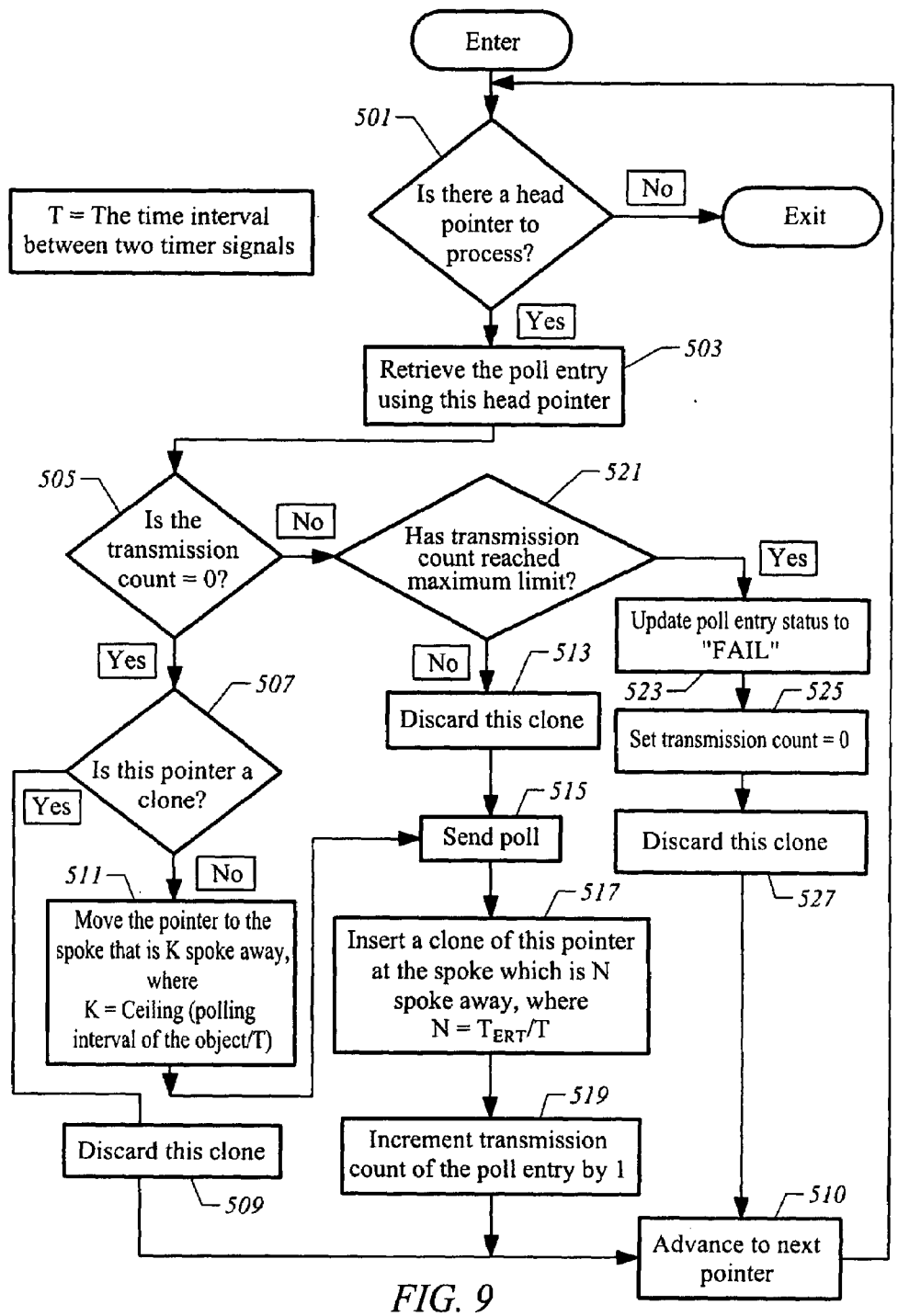
FIG. 9 shows a flowchart of a process of managing polling requests to nodes at a time interval.

FIG. 9 shows a flowchart of a process of processing the pointers in the spoke or bin at step 359 of FIG. 7. At a step 501, it is determined whether there is a pointer or node to process. If there is a pointer to process, the entry for the node in table 251 is retrieved at a step 503. Although it is not necessary to actually retrieve the entry, it should be understood that the following steps shown in FIG. 9 refer to fields in table 251 and more specifically to the field for the entry for the node.

At a step 505, it is determined if the transmission count is equal to zero. A transmission count of zero indicates that there have been no polling messages that have been sent to this node that have not received a response. If the transmission count is equal to zero, it is determined if the pointer is a clone at a step 507. By a "clone" it is meant that the pointer is a copy of another pointer in the circular list. In general, a pointer will be placed at the time interval in the circular list for polling the node and clones of the pointer will be placed in the circular list when a response from a polling message is expected to be received.

If the pointer is a clone, the clone is discarded at a step 509 and the flow is advanced at the next pointer at a step 510. The clone is discarded because although the clone indicates that a response to a polling message is expected by the current time, the transmission count being equal to zero indicates that the response has been received. Thus, the clone can be discarded.

If the pointer is not a clone, the pointer is moved to the spoke or bin when the node should be polled again. An example of a formula for calculating the spoke to move the pointer to is K spokes away where K equals the ceiling of (polling interval of the object/T), where T represents the time interval between two timer signals. Other formulas for calculating the spoke to move the pointer can be utilized in other embodiments. Also, it should be noted that moving the pointer can be accomplished in other ways such as copying the pointer and then deleting the current pointer and other combinations thereof.

A polling message is sent to the node at a step 515. At a step 517, a clone of this pointer is inserted at the spoke when a response from the node is expected. An example of a formula for calculating N spokes away when the response from the polling message is expected is N equals (expected response time/T). Other formulas can be utilized in other embodiments.

At a step 519, the transmission count of the node is incremented by 1. The flow of the polling process is advanced to the next pointer step 510. Thus, an initial polling message has been sent to the node.

If a response to the polling message is received before the expected time of response, the response will be processed, the transmission count set to zero and the pointers and clones manipulated as described above in FIG. 8. However, if a response to the polling message is not received by the estimated response time, the polling process will continue as follows.

It will be determined that the transmission count is not equal to zero at step 505. This indicates that a polling message has been sent to the node and the response has not been received. At a step 523, it is determined whether the transmission count has reached the maximum limit. If the transmission count has not reached the maximum limit, then another polling message will be sent to the node. Before sending the polling message to the node, the clone is discarded at a step 513 as the clone indicated the time when a response was expected but was not received.

Steps 515, 517, 519, and 510 will send a polling message, insert a clone at the spoke when a response is expected, increment the transmission count, and advance to the next pointer as described above. Thus, a retransmission of a polling message has been accomplished.

If it is determined at step 521 that the transmission count has reached the maximum limit, the node has been sent polling messages equal to the maximum limit and has not responded. At a step 523, the operational status of the node is updated to "failed" indicating the polling has failed to ascertain the operational status from the node. The transmission count is set equal to zero at a step 525 and the clone is discarded at a step 527. As before, the flow advances to the next pointer at step 510.

In general, there is one pointer on the circular list for each node that is to be polled. Initially, the pointers are preferably allocated around the circular list in a uniform manner. The pointers indicate when an initial polling message will be sent to the node to ascertain the operational status at periodic intervals. A clone of the pointer can exist on the circular list when it is expected that a response to a polling message will be received.

The size of the circular list and the time intervals can be set according to many factors. For example, the factors can include the size of table 251, the resources available to the network management system, the capacity of the operating system at the network management system to receive and process the poll responses, available network bandwidth, and the like. Preferably, there should be enough bins in the circular list so that the polling process is finished with the bin before the timer goes off for processing the next bin.

If there are a flood of responses from polling messages and the polling process is not able to process all the pointers within the bin in a single time interval, the pointers may be distributed among the subsequent bins (e.g., add one pointer to each subsequent bin until the pointers are redistributed). Other than that, the processing of the bins can remain unchanged.

When a new network device is discovered or added to the network, a new entry will be made in table 251. Preferably, pointers to the new nodes will be distributed in a manner that tends to evenly distribute the pointers. For example, the pointers can be distributed in a round robin fashion where the pointers are added one to a bin around the circular list.

Figure 10:
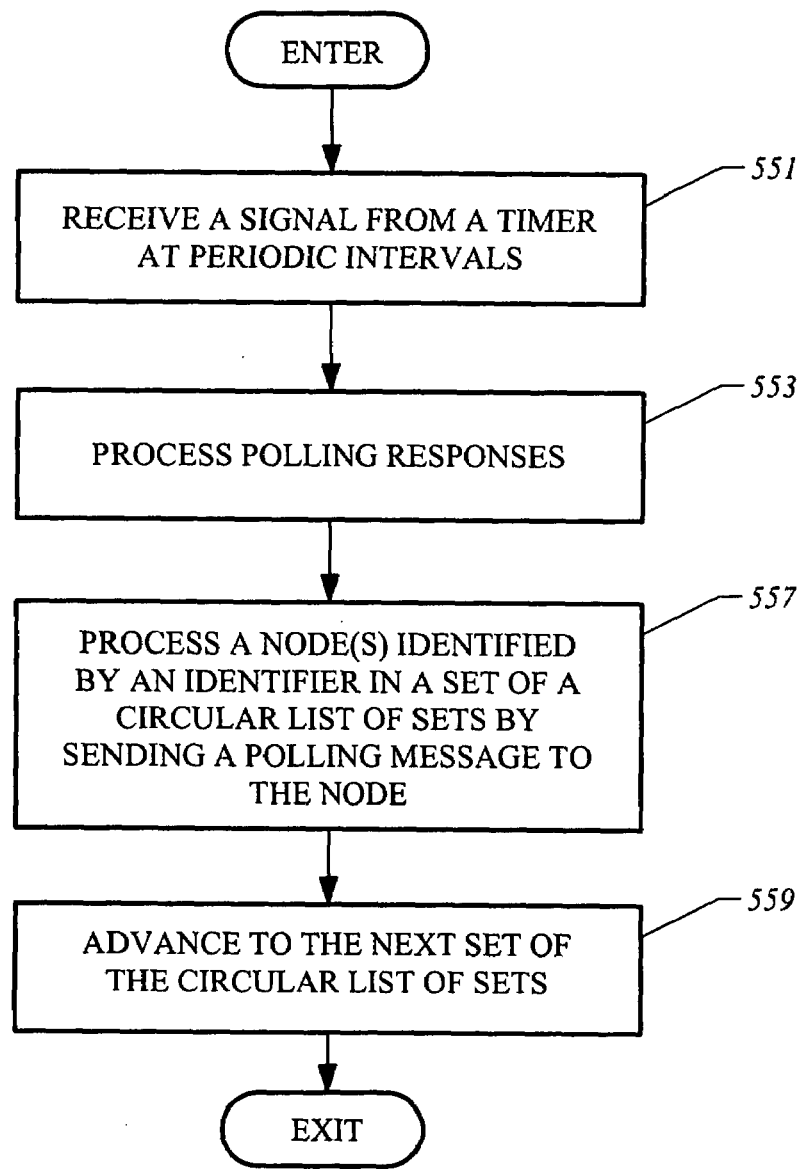
FIG. 10 shows a flowchart of a process of monitoring nodes in a network that processes polling responses and sends polling messages to nodes identified by a circular list of sets at periodic intervals.

FIG. 10 shows a flowchart of another process of monitoring nodes in a network. At a step 551, a signal from timer is received at periodic intervals. Polling responses to polling messages are processed at a step 553.

At a step 557, one or more nodes identified by an identifier in a set of a circular list of sets is processed by sending a polling message to the node. The term "set" is utilized to indicate that the bin or spoke can be of any structure as it stores zero or more identifiers for nodes. The flow advances to the next set of the circular list of sets at a step 559.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A method of monitoring nodes in a network comprising a network management system and a plurality of nodes, the network management system comprising a set of identifiers in a circular list of sets, the method comprising:
   processing at a network management station comprising the network management system at least one node identified by an identifier in the set of a circular list of sets by sending a polling message from the network management station to the at least one node, at least a portion of the sets of the circular list of sets including two or more node identifiers;
   advancing to the next set of the circular list of sets; and
   receiving a polling response from the node at the network management system and updating a status of the node;
   wherein processing comprises adding a copy of the identifier to a subsequent set of the circular list of sets that will be processed when a response from the node identified by the identifier is expected.

2. The method of claim 1 further comprising moving the identifier to a subsequent set of the circular list of sets.

3. The method of claim 2, wherein the subsequent set is the set that will be processed at the next timing interval of the node identified by the identifier.

4. The method of claim 1, further comprising processing polling responses.

5. The method of claim 1, wherein the selecting and advancing are performed at periodic intervals.

6. The method of claim 1 wherein processing at least one node comprises retrieving an entry for the node in a table.

7. The method of claim 6 wherein the table comprises information on the nodes identified by the identifiers including IP addresses of the nodes.

8. A system, comprising:
   a processor; and
   a memory storing a network management system for execution by the processor for monitoring nodes in a network including a plurality of nodes, the network management system comprising:

computer code that processes at least one node identified by an identifier in a set of a circular list of sets, at least a portion of the sets of the circular list of sets including two or more identifiers of nodes;

computer code that adds a copy of the identifier to a subsequent set of the circular list of sets that will be processed when a response from the node identified by the identifier is expected; and computer code that advances to the next set of the circular list of sets;

wherein code that processes comprises code that sends a polling message to said at least one node, receives a polling response from the node, and updates a status of the node.

9. The system of claim 8 further comprising code that moves the identifier to a subsequent set of the circular list of sets.

10. A system for monitoring nodes in a network including a plurality of nodes, comprising:

means for processing at least one node identified by an identifier in a set of a circular list of sets, at least a portion of the sets of the circular list of sets including two or more identifiers of nodes;

means for adding a copy of the identifier to a subsequent set of the circular list of sets that will be processed when a response from the node identified by the identifier is expected; and means for advancing to the next set of the circular list of sets;

wherein means for processing comprises means for sending a polling message to said at least one node, receiving a polling response from the node, and updating a status of the node; and wherein said means for processing, means for adding, and means for advancing comprise a hardware means or a software means executed by a hardware means.

11. A method of monitoring nodes in a network comprising a network management system and a plurality of nodes, comprising:

receiving a signal from a timer at periodic intervals;

processing polling responses at a network management station comprising the network management system;

processing at least one node identified by an identifier in a set of a circular list of sets by sending a polling message to the at least one node from the network management station and adding a copy of the identifier to a subsequent set of the circular list of sets that will be processed when a response from the node identified by the identifier is expected, at least a portion of the sets of the circular list of sets including two or more identifiers of nodes;

advancing to the next set of the circular list of sets; and receiving a polling response from the node at the network management system and updating a status of the node;

wherein each of said identifiers comprises a pointer into a table stored in said network management station.

12. The method of claim 11, wherein the processing the at least one node includes moving the identifier to a subsequent set of the circular list of sets.

13. The method of claim 12, wherein the subsequent set is the set that will be processed at the next timing interval of the node identified by the identifier.

14. The method of claim 11 wherein said table comprises IP addresses of said plurality of nodes in the network and a transmission count representing the number of polling messages sent to each of said nodes.

15. The method of claim 11 wherein processing polling responses comprises removing the polling response from a buffer.

16. The method of claim 11 wherein processing polling responses comprises updating a transmission count for the node sending the polling response to indicate the number of polling responses that have been received from the node.

17. The method of claim 11 further comprising creating a copy of the pointer in the circular list when a response from a polling message is expected to be received.

18. A system, comprising:

a processor; and a memory storing a network management system for execution by the processor for monitoring nodes in a network including a plurality of nodes, the network management system comprising:

computer code for a timer that generates a signal at periodic intervals;

computer code for a poller that processes polling responses; processes at least one node identified by an identifier in a set of a circular list of sets by sending a polling message to the at least one node, receiving a polling response from the node, and updating a status of the node; adds a copy of the identifier to a subsequent set of the circular list of sets that will be processed when a response from the node identified by the identifier is expected, at least a portion of the sets of the circular list of sets including two or more identifiers of nodes; and advances to the next set of the circular list of sets.

19. The system of claim 18 wherein said processing and advancing are performed at periodic intervals.

20. A system for monitoring nodes in a network including a plurality of nodes, comprising:

means for receiving a signal from a timer at periodic intervals;

means for processing polling responses;

means for processing at least one node identified by an identifier in a set of a circular list of sets by sending a polling message to the at least one node and adding a copy of the identifier to a subsequent set of the circular list of sets that will be processed when a response from the node identified by the identifier is expected, at least a portion of the sets of the circular list of sets including two or more identifiers of nodes;

means for advancing to the next set of the circular list of sets; and means for receiving a polling response from the node and updating a status of the node;

wherein said means for processing, means for advancing, and means for receiving comprise a hardware means or a software means executed by a hardware means.

* * * * *